March 31. 1925.

J. LLOYD

JOINT FOR TUBULAR FRAME MEMBERS

Filed Dec. 13, 1923

1,531,962

3 Sheets-Sheet 1

INVENTOR
John Lloyd
PER
Spear, Middleton, Donaldson, Hall
ATTORNEY

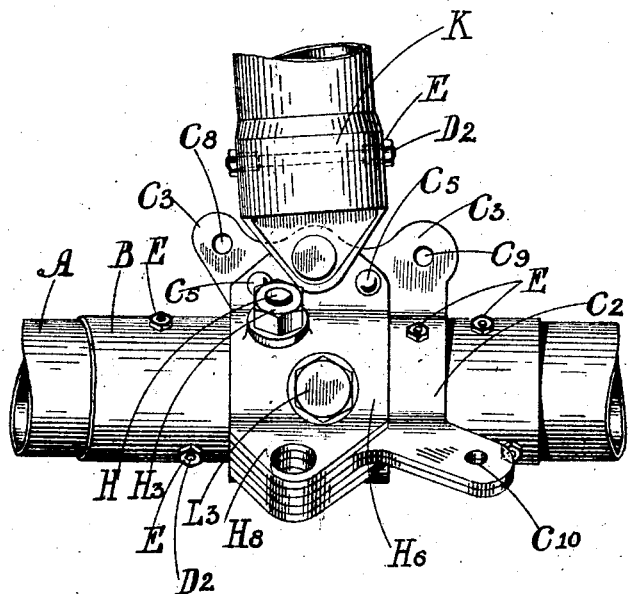
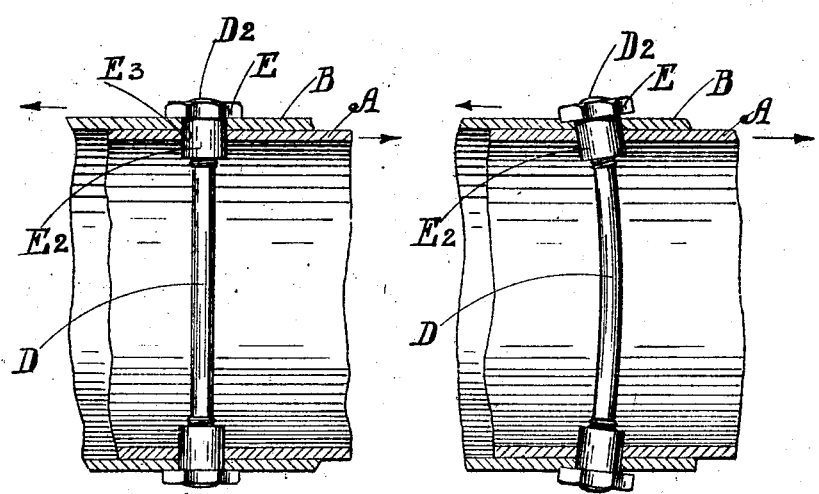

March 31, 1925

J. LLOYD 1,531,962

JOINT FOR TUBULAR FRAME MEMBERS

Filed Dec. 13, 1923

3 Sheets-Sheet 3

INVENTOR.
John Lloyd
PER.
ATTORNEY.

Patented Mar. 31, 1925.

1,531,962

UNITED STATES PATENT OFFICE.

JOHN LLOYD, OF COVENTRY, ENGLAND, ASSIGNOR TO ARMSTRONG SIDDELEY MOTORS LIMITED, OF COVENTRY, ENGLAND, A BRITISH COMPANY.

JOINT FOR TUBULAR FRAME MEMBERS.

Application filed December 13, 1923. Serial No. 680,449.

*To all whom it may concern:*

Be it known that I, JOHN LLOYD, a subject of the King of England, residing at Coventry, in the county of Warwick, England, have invented certain new and useful Improvements in Joints for Tubular Frame Members, of which the following is a specification.

This invention relates to joints for tubular frame members, of the kind in which one element of the joint encircles the other in the form of a sleeve, clip or socket forming part of or having attached to it other frame members, such as struts, ties or brackets, and it is particularly intended for use in uniting together the various members employed for the framework of aircraft or for the securing to the spars or other frame members of lugs, clips, brackets or the like.

It is the object of the invention to provide a form of joint which, while of an exceedingly simple, light, and relatively inexpensive kind, wholly avoids the necessity for brazing, welding or the like and has a strength which is considerably above that which would be inferred from a consideration of the stresses to which the joint is subjected.

Figure 1:
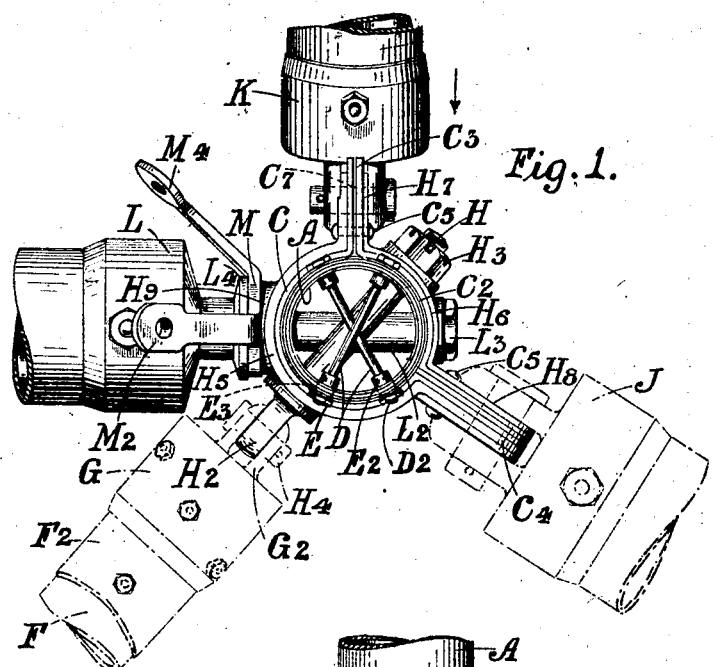
Figure 2:
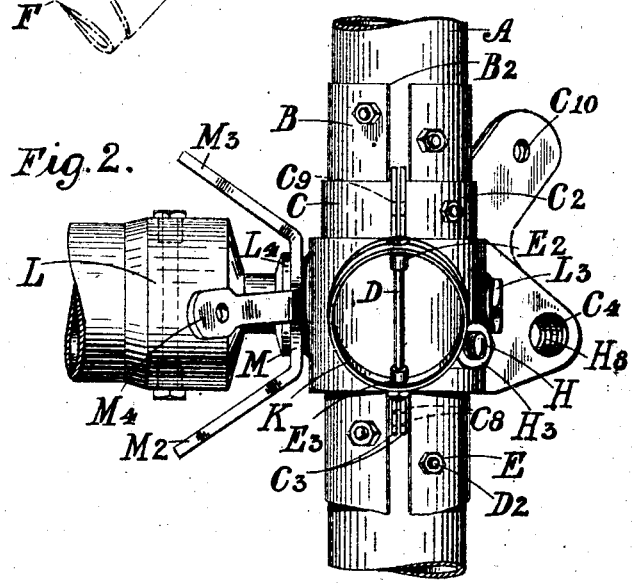
Figure 6:
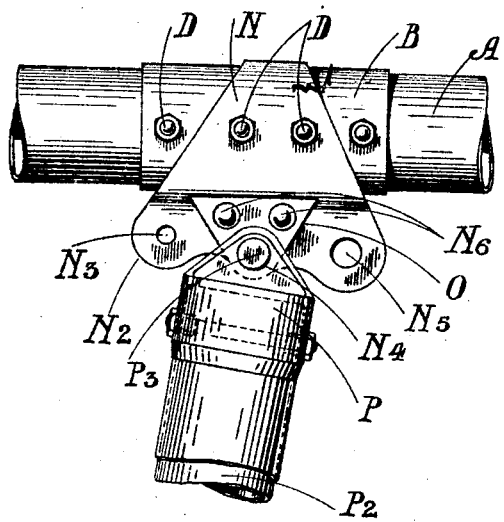
Figure 7:
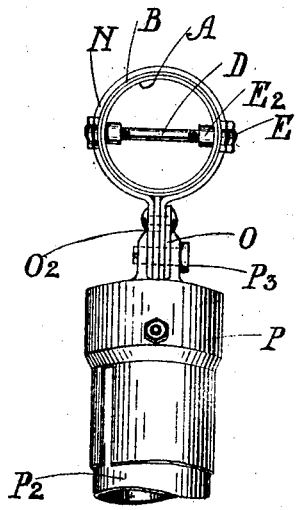
Figure 8:
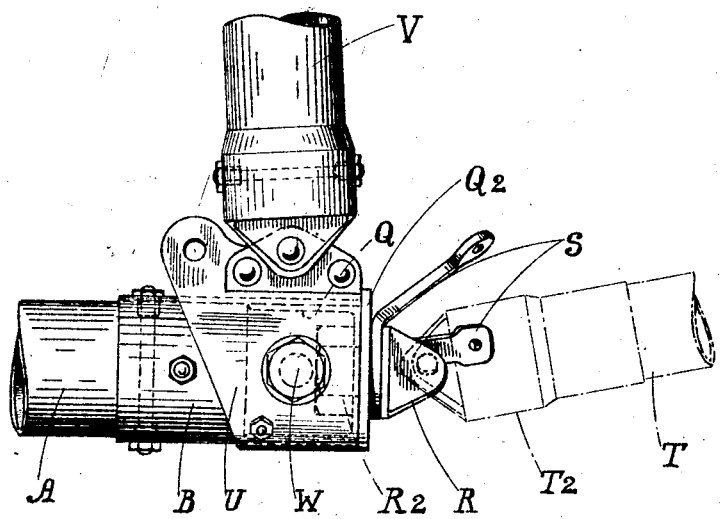

In the accompanying drawings which illustrate the manner of carrying out the invention, Figure 1 is an end elevation of a spar or like tubular member for use upon aircraft, to which are secured by the improved jointing means lugs for the attachment of a strut with a tie-rod on each side of it, as well as one or more socket pieces each carrying another tubular member, Figure 2 is a plan as seen from above omitting for clearness certain portions, Figure 3 is a side elevation as seen from the right of Figure 1, Figure 4 is an enlarged view of the fastener in its normal condition, Figure 5 is a corresponding view of the fastener showing in a considerably exaggerated manner the form it assumes under stress at the joint, Figure 6 is a side elevation of a simpler form of joint than that shown in Figures 1–3, having certain modifications in its parts, Figure 7 is an end view of Figure 6, and Figure 8 is a further modified form of the joint suitable for use at the extreme end of the tubular member.

Around the tubular member A is a sleeve B split at $B^2$ in the axial direction. Encircling the split sleeve is a clip C, $C^2$ of sheet metal formed in two parts and provided with lugs $C^3$, $C^4$, by means of which the sides of the clip can be drawn together by rivets $C^5$, the lugs being provided with eyes at $C^7$, $C^8$ and $C^9$ for attachment thereto of the above mentioned struts and tie-rods. An additional eye $C^{10}$ is also shown as part of the lugs $C^4$.

The fasteners which secure the split sleeve and the lug to the member A are in the form of rods D screw-threaded at each end $D^2$, and there provided with nipples having a head E of hexagonal or other non-circular form and a plain cylindrical body $E^2$ adapted to fit in holes $E^3$ drilled completely through the elements of the joint from side to side at suitable positions along it, or around it. The nipples are tightened up so that the heads bear against the outer faces of the split sleeve B and the clip C respectively, (see Figure 4) and may be further secured by lock nuts.

The fasteners thus prevent both axial and rotational movement of the joint, and in resisting the axial or the rotational stresses upon the joint the rods D bend slightly and tilt the nipples so that their heads tend to rise slightly upon one side and to be more firmly compressed on the other side, thus producing the pinching effect which is the feature of the invention, (see Figure 5, in which the bending effect is considerably exaggerated).

Figures 1–3 also illustrate the application of the invention to a socket joint where a second tubular frame member F provided with a liner $F^2$ similar to B is secured in a socket G by the fasteners D as just described. The socket itself may be provided with jaws $G^2$ adapted to embrace an eye $H^2$ on a stem H extending completely through the joint and secured by a nut $H^3$. A pin or other fastener $H^4$ extends through the jaws $G^2$ and the eye $H^2$, thereby providing a hinge connection for the tube F. Stiffening plates $H^5$ and $H^6$ encircling the clips C, $C^2$, with lugs $H^7$ and $H^8$ lying against the lugs $C^3$ and $C^4$ respectively reinforce the latter and give the necessary strength for attachment of the socket G and other sockets also when required.

In Figure 1 are shown three other sockets J, K, and L, each for a tubular member, the sockets J and K being directly hinged to the lugs C³ and C⁴ and the lugs H⁷ and H⁸ respectively of the clip C and stiffening plates H⁵, H⁶, while the socket L is provided with an integral stem L² which extends completely through the joint and is secured by a nut L³, a collar L⁴ on the stem bearing against a boss H⁹ on the plate H⁵. This provides also for securing by the same stem L² a plate M having arms M², M³ and M⁴ suitably bent out of the plane of the part M and terminating in eyes for the attachment of stays.

It will be seen that with the sockets J, K and L the split sleeve corresponding to B and F² is omitted from the joint, as in certain cases it is not necessary.

The form of joint shown in Figures 6 and 7 is of a simpler nature than the foregoing but retains the split sleeve B secured as before to the tubular member A. The clip N which encircles the sleeve B is made in one part with lugs at N² wide enough to provide for three eyes N³, N⁴ and N⁵ for attachment of stays or struts, one of the latter being illustrated at N⁴. The clip on the side opposite to the lugs N² is made only as wide as is necessary for strength, and the fasteners D extend as before through all three members as well as through the sleeve B and member A only. Rivets N⁶ serve to unite the clip together and also to secure upon it reinforcing and thickening plates O, O², to enable the socket P for the strut P² to be hinged to the eye N⁴ in a substantial manner by means of the hinge pin P³.

In Figure 8, the tubular member A is provided with the split sleeve B at its end, the ends of the sleeve and of the member A being level with one another. A hollow plug Q having a flange Q² extends into and closes the end of the tubular member and provides for the attachment thereto of a jaw portion R secured to the plug Q by means of a threaded stem R², and providing thereby for the attachment of stay fastenings S. To the jawed portion R may be hinged the socket T² of a strut T as in previous arrangements. Surrounding the sleeve B is a clip U closely resembling the clip N (Figures 6 and 7) but of a simpler form. This is also arranged to have connected to it a tubular member V. Furthermore, by means of a screwed stem W extending through the clip U, sleeve B, tubular member A and hollow plug Q, other stays may be attached, as in the manner shown in Figures 1–3.

It will be understood that the spacing of the fasteners D along and around the elements of the joint will be such as to cause the least weakening to the members of the joint.

It will be seen that by this invention a load which tends to cause relative movement of the socket or the like along or around the spar or other tubular member causes a bending of the fastener, such that the plane of each of its heads is inclined to the face on which normally it bears, one side of the head lifting (or tending to lift) somewhat, while the opposite side is correspondingly compressed (particularly at its outer edge) against the seating face, with the result that the two elements of the joint are pinched tightly together and their frictional engagement is very greatly increased. In this way the joint will then withstand loads in excess of that which would be anticipated by a calculation based upon the dimensions and the nature of the material employed in its constitution.

Although the fastener D is preferably formed in the manner above described, it will be obvious that the nipple at one end might be formed integrally with the body of the rod. The construction illustrated, however, is equally satisfactory and less expensive.

What I claim as my invention and desire to secure by Letters Patent of the United States is:—

1. In a joint for tubular frame members, the combination of a tubular member forming one element of the joint, a part encircling said tubular member forming the second element of said joint, a fastener extending completely through both elements, a head at each end of said fastener which bears against said second element, and a neck portion under each head of greater cross sectional area than said fastener, thereby to permit tilting of said head and neck portions through flexure of said fastener under axial or twisting load upon the joint, substantially as set forth.

2. In a joint for tubular frame members, the combination of a tubular member forming one element of the joint, a part encircling said tubular member forming the second element of said joint, a fastener in the form of a rod extending completely through both elements, a shouldered nipple secured upon each end of said rod comprising a plain body part which extends through the wall of each element and a head part which bears against the outer element secured upon each end of said rod and relatively adjustable towards one another to bear against the outer element, substantially as set forth.

3. In a joint for tubular frame members, the combination of a tubular member forming one element of the joint, a part encircling said tubular member forming the second element of said joint having attached to it load-carrying members, a fastener extending completely through both elements comprising a rod, shouldered nipples screw-threaded thereon at each end, each having a body part which extends through the adjacent walls of each element and a head part which bears against the outer element, and means for locking said nipples when screwed up upon said rod, substantially as set forth.

In testimony whereof I have signed my name to this specification in the presence of two subscribing witnesses.

JOHN LLOYD.

Witnesses:
S. J. MATES,
H. G. C. WILSON.